United States Patent [19]

Wakabayashi et al.

[11] 4,293,363
[45] Oct. 6, 1981

[54] PANEL ASSEMBLING METHOD

[75] Inventors: Makoto Wakabayashi, Koshigaya; Haruyoshi Takagishi, Yamato, both of Japan

[73] Assignee: Nissan Motor Company Limited, Kanagawa, Japan

[21] Appl. No.: 45,437

[22] Filed: Jun. 4, 1979

[30] Foreign Application Priority Data

Jun. 8, 1978 [JP] Japan .................................. 53/69191
Jun. 8, 1978 [JP] Japan .................................. 53/69192

[51] Int. Cl.³ ............................................ B29C 19/02
[52] U.S. Cl. ...................................... 156/272; 29/428; 29/458; 29/462; 156/275; 156/379.7; 219/9.5; 219/10.41; 219/10.43; 219/10.81
[58] Field of Search ............... 156/272, 273, 274, 275, 156/380; 29/428, 429, 430, 458, 462, 527.1, 527.2, DIG. 1, DIG. 21, DIG. 24; 219/10.81, 148, 9.5, 10.53, 10.41, 10.43, 10.79

[56] References Cited

U.S. PATENT DOCUMENTS

| | | | |
|---|---|---|---|
| 2,705,993 | 4/1955 | Mann et al. | 156/274 |
| 2,774,700 | 12/1956 | Killington | 156/272 |
| 3,222,234 | 12/1965 | De Jean et al. | 156/272 |
| 3,660,217 | 5/1972 | Kehr et al. | 156/272 |
| 3,679,534 | 7/1972 | Weinberg | 156/275 |
| 3,761,670 | 9/1973 | Slaats et al. | 219/10.81 |
| 3,860,778 | 1/1975 | Rudd et al. | 219/9.5 |

FOREIGN PATENT DOCUMENTS 737374 9/1955 United Kingdom .
908627 10/1962 United Kingdom .
1308134 2/1973 United Kingdom .

Primary Examiner—Caleb Weston
Attorney, Agent, or Firm—Schwartz, Jeffery, Schwaab, Mack, Blumenthal & Koch

[57] ABSTRACT

A panel assembling method is disclosed which comprises the steps of coating a thermosetting adhesive on the connection area of a first panel to be fixed to the connection area of a second panel, mating the connection areas of the first and second panels, heating a portion of the connection area of the first or second panel to set the adhesive on the portion, by passing a current, possibly a high-frequency current, through the portion between electrodes which are contacted to it, thereby temporarily assembling the first and second panels, and subsequently heating all of the connection area of the first or second panel to set the adhesive entirely on the connection area. An apparatus for partially setting the thermosetting adhesive is also disclosed.

4 Claims, 8 Drawing Figures

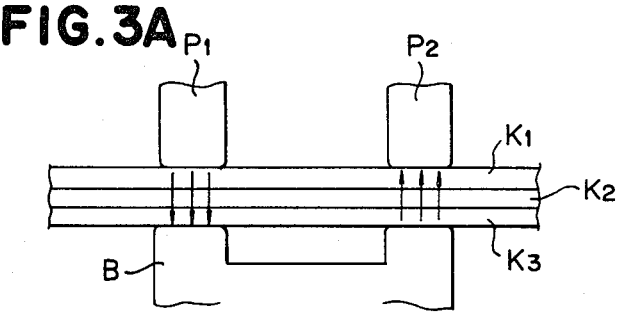
FIG. 3A
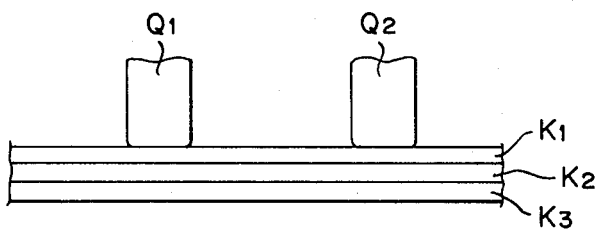
FIG. 3B
FIG. 5
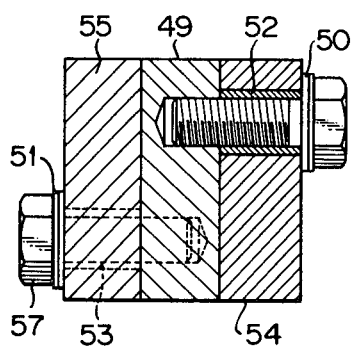
FIG. 7
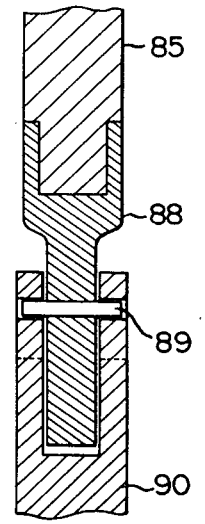

PANEL ASSEMBLING METHOD

BACKGROUND OF THE INVENTION

1. Field of the Invention

This invention relates to a method and apparatus for assembling panels into a vehicle component such as a vehicle door, hood or the like using a thermosetting structural adhesive and, more particularly, to a method and apparatus for partially setting the thermosetting structural adhesive to temporarily combine the panels with a strength sufficient to tolerate external forces to be exerted thereon during processes for installing the vehicle component to a vehicle body.

2. Description of the Prior Art

Heretofore, several approaches have been utilized for assembling panels into a vehicle component such as a vehicle door, trunk lid, hood or the like. For example, it is common practice to spot-weld inner and outer panels which have their peripheral areas folded over. However, this requires an additional process to remove the mark left on the panel surface by the electrode used in the spot-welding process for the sake of a good finished appearance. In order to eliminate such a spot-welding process, a method has been proposed to use a thermosetting structural adhesive in assembling the panels into a vehicle component, which includes (1) coating a thermosetting structural adhesive entirely or partially on the peripheral areas of the inner and outer panels, (2) folding the edges of the inner and outer panels together to form a vehicle component such as, for example, a vehicle door, (3) installing the vehicle component to a vehicle body, (4) undercoating it such as by electrodeposition coating, (5) drying the coating and simultaneously setting the structural adhesive so as to provide a sufficient strength to the vehicle component by applying heat to the entire vehicle body, and (6) final-coating it. One difficulty with such a conventional method is that since the vehicle component is installed to the vehicle body before the structural adhesive is dried and thus while it is not fully cured, one of the inner and outer panels may get out of position with respect to the other, resulting in deformation of the vehicle component, if the vehicle component is wrenched with a strong force for adjustment of its position relative to the vehicle body during installation of the vehicle component to the vehicle body.

Another method has also been proposed to partially heat the edge flange at which the inner and outer panels are folded together by high frequency electrical indication heating for partially setting the structural adhesive before installation of the vehicle component to the vehicle body. In this method, a coil connected to a source of high frequency current is located on the side of the flange which will not be on the outside of the vehicle so as to produce induced current in the flange area so as to heat it. With such a method, however, all of the thickness of the flange will be heated; that is, such induced current will be produced not only in the folded-over portion of the outer panel but also in the flange of the inner panel and the side of the outer panel remote from the coil, causing formation of an oxide film on the surface of the outer panel exposed to view.

SUMMARY OF THE INVENTION

It is therefore one object of the present invention to provide an improved method and apparatus which can temporarily assemble panels into a vehicle component with a strength sufficient to tolerate external forces to be exerted thereon in installation of the vehicle component to a vehicle body.

Another object of the present invention is to provide an improved method and apparatus which can partially set the thermosetting adhesive coated on the connection area of an outer panel mated with the connection area of an inner panel with great efficiency and without formation of any oxide film on the outer panel exposed to view.

Still another object of the present invention is to provide an improved method and apparatus in which adjustment of the degree of setting of thermosetting adhesive and application to mass-production lines are easy.

BRIEF DESCRIPTION OF THE DRAWINGS

Other objects and advantages of the present invention will become apparent upon reading the following detailed description and upon reference to the drawings, in which:

FIGS. 3A and 3B are schematic views showing the principles of the present invention;

FIG. 5 is a sectional view taken along the line V—V of FIG. 4;

FIG. 7 is a sectional view taken along the line VII—VII of FIG. 6.

DETAILED DESCRIPTION OF THE INVENTION

Figure 1:
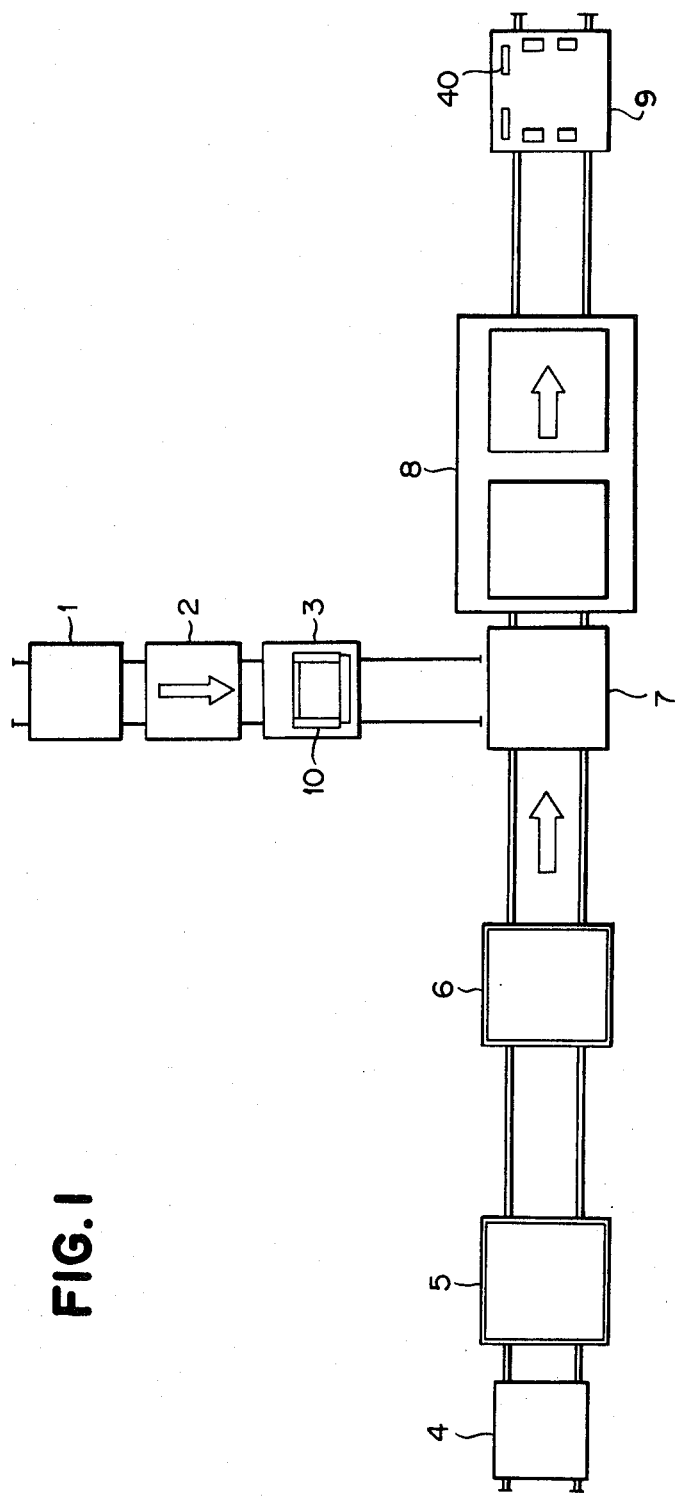
FIG. 1 is a schematic diagram showing a vehicle component assembling line.

Referring now to FIG. 1, there is illustrated in diagram form part of an assembling line including a number of processing stations through which inner and outer panels are assembled to form a vehicle component such as, for example, a vehicle door. An outer panel is put into the line automatically or by an operator from an outer panel input station 1 and is moved to a primer coating station 2 where primer is coated on a desired area of the outer panel. Next, the outer panel passes an adhesive coating station 3 including an automatic adhesive spraying apparatus 10 to be described later in more detail for coating a thermosetting structural adhesive on the area of the outer panel to be seamed with an inner panel. Further, an inner panel with a sash temporarily secured thereto is put into the line automatically or by an operator from an inner panel input station 4 and is moved to welding stations 5 and 6 where brackets for a door lock, door hinge or the like are welded to the inner panel. The inner and outer panels are mated with each other in a marriage station 7 and then the edges of the mated panels are folded over together in a folding station 8. Subsequently, the folded-together panels are introduced into an adhesive setting station 9 including an adhesive setting apparatus 40 to be described later in more detail for heating, for example, two points for each of three sides of the vehicle component so as to partially set the structural adhesive. It is to be noted that the structural adhesive may not be completely set but should be incompletely set to such an extent that the inner and outer panels can be combined with a strength sufficient to tolerate external forces to be exerted thereon in the following processes until the vehicle component is installed to the vehicle body.

Figure 2:
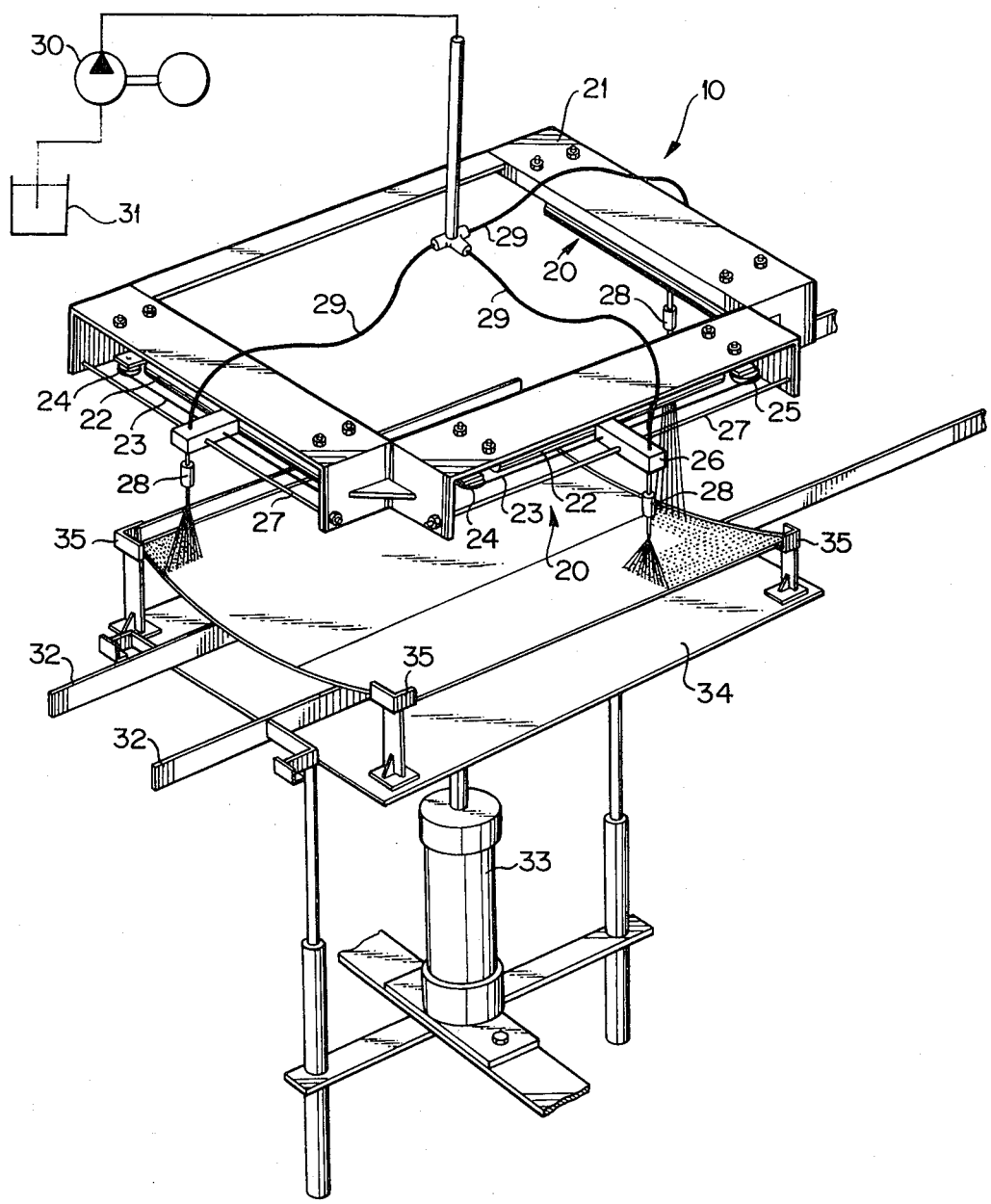
FIG. 2 is a perspective view showing an automatic adhesive spraying apparatus.

Referring to FIG. 2, the automatic adhesive spraying apparatus 10 of this embodiment is shown as comprising three sprayers generally designated as 20. The sprayers 20 are mounted to respective mounting frames 21 arranged to define three sides of a rectangular frame. Each of the sprayers 20 comprises a drive cylinder 22 fixed to the mounting frame 21. The drive cylinder 22 has a piston with its opposite ends connected through a chain 23 guided by pulleys 24 and 25. Secured to the chain 23 is a slider 26 slidably supported on a guide rod 27 fixed to the mounting frame 21. The slider 26 carries a spray gun 28 which is connected, by means of a hose 29, through a pump 30 to a tank 31 having a supply of a thermosetting structural adhesive.

When an outer panel is carried on shuttle bars 32 to the automatic adhesive spraying apparatus 10, a lift cylinder 33 is actuated to lift an underframe 34 having locator members 35 secured thereto so as to position the outer panel. Under this condition, the structural adhesive is sprayed from the spray guns 28 onto the areas of the outer panel to be seamed while the cylinders 22 are actuated to move the spray guns 21. Although the spray guns 28 can move only in a plane in the illustrated embodiment, this is satisfactory since the outer panel of a vehicle component such as a vehicle door, hood or the like is not greatly curved.

Examples of thermosetting structural adhesive applicable to the present invention are enumerated in Table 1 which include 100 parts of a mixture of liquid epoxy resin, diluent epoxy resin, hardener, filler and modifier, and 1 to 7 parts of silicon dioxide ($SiO_2$ and $SiO_2 \cdot nH_2O$ where $n=1$ to 3) and which have room temperature kinematic viscosities less than 50,000 cps and elevated temperature static viscosities more than 50,000 cps as shown in Table 2.

Experiments show that in order to certainly and positively set a thermosetting structural adhesive between panels, it is desirable to heat the panels themselves, for example, by electric current flowing directly through the panels. FIGS. 3A and 3B schematically show adhesive setting arrangements which the inventors have considered for this purpose. In the arrangement of FIG. 3A, a pair of main electrodes P1 and P2 are placed in contact with the upper surface of an assembly of panels K1 to K3 and a counter electrode B is placed in contact with the lower surface thereof and power is supplied between the electrodes P1 and P2. In this arrangement most of the electric current will flow from the electrode P1 through the panel assembly to the counter electrode B and hence through the panel assembly to the electrode P2. Thus, the panel assembly will be heated locally only at its areas in contact with the electrodes and the degree of setting of the structural adhesive is too low to provide a strong connection between the panels. Additionally, the electrodes exert a large pressure on the panel assembly to squeeze the structural adhesive out. In the arrangement of FIG. 3B, a pair of electrodes Q1 and Q2 are placed in contact with the upper surface of an assembly of panels K1 to K3 so that electric current supplied between the electrodes will flow from the electrode Q1 through the panel K1 to the electrode Q2 thereby heating the area of the panel K1 located between the electrodes Q1 and Q2. Since the structural adhesive between the panels serves as an insulator, substantially no electric current will flow through the panels K2 and K3. By the use of high frequency electricity, which has a skin effect, this insulation of current to the layer K1 is intensified. In this arrangement, the electrodes exert small pressure on the panel assembly and thus the structural adhesive is not liable to be squeezed out.

Figure 4:
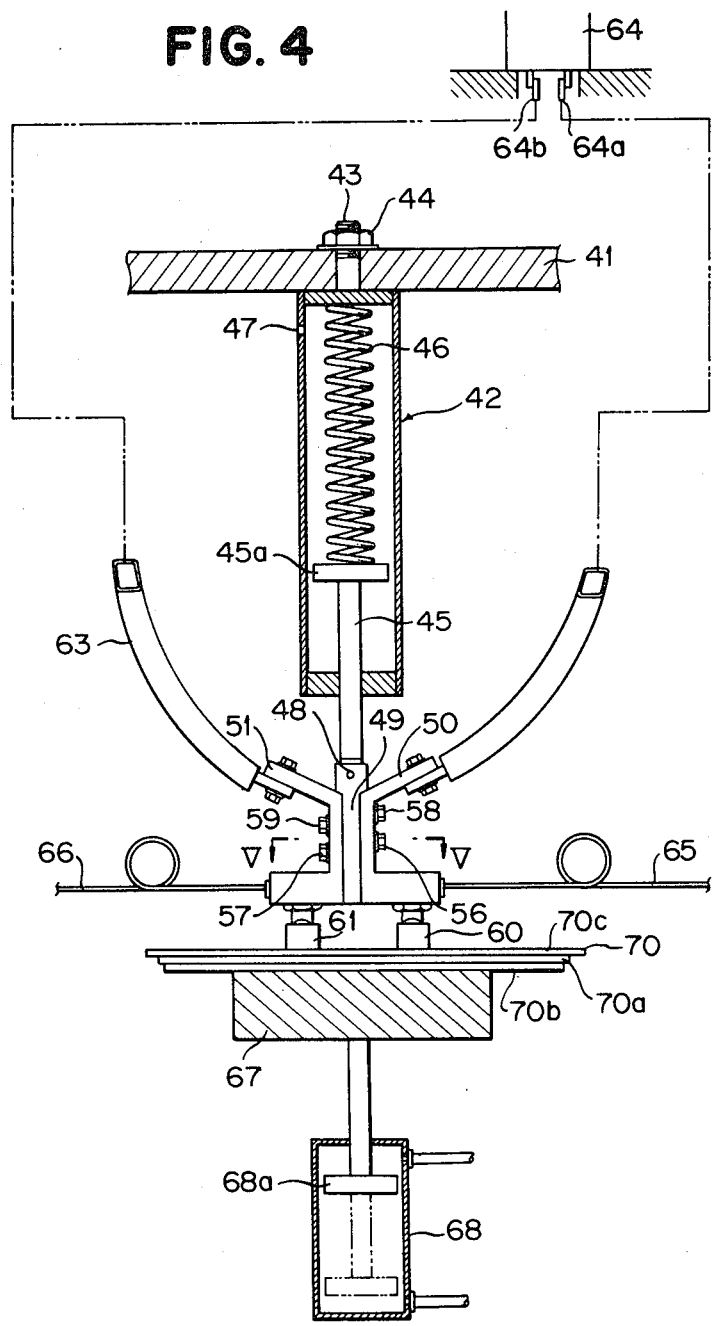
FIG. 4 is an elevational view in section showing one embodiment of an adhesive setting apparatus of the present invention.

FIG. 4 illustrates one embodiment of an adhesive setting apparatus of the present invention. The adhesive setting apparatus 40 comprises a mounting plate 41, and a buffer cylinder 42 mounted at its upper end to the mounting plate 41 such as by a bolt 43 and a nut 44. The buffer cylinder 42 contains therein a piston rod 45 having at its upper end a piston 45a and a buffer spring 46 urging the piston 45a downward. The buffer cylinder 42 is formed at its upper portion with an air vent 47. The lower end of the piston rod 45 is connected through a pin 48 to a rock plate 49 formed of an insulating material. A pair of conductive holders 50 and 51 are secured to the opposite sides of the rock plate 49 through insulating washers 52 and 53 and insulating bushes 54 and 55 such as by bolts 56 to 59 as shown in detail in FIG. 5. A pair of electrodes 60 and 61 are fixed to the lower surfaces of the respective holders 50 and 51 and are connected through cables 62 and 63 to the terminals 64a and 64b of a source of electric current 64. It is to be noted that the current source 64 may be a source of high frequency electric current. Cooling water hoses 65 and 66 are provided for cooling the holders 50 and 51 and also the electrodes 60 and 61. The adhesive setting apparatus also comprises a table 67 formed of an insulating material for supporting thereon the flange portion 70 of a vehicle component at which the inner and outer panels 70a and 70b are seamed, and a lift cylinder 68 containing therein a piston 68a for lifting and lowering the table 67.

The operation is as follows: When no vehicle component is carried to the adhesive setting station 10, the piston 68a of the lift cylinder 78 is in its lower position indicated by the phantom lines and the piston 45a of the buffer cylinder 42 is urged against the lower end plate of the buffer cylinder 42. When a vehicle component such as a vehicle door is carried to the adhesive setting station 10 by means of a conveyer (not shown), the lift cylinder 68 is actuated to lift the table 67 so as to bring the flange portion 70 of the vehicle component up into contact with the electrodes 60 and 61. As a result, electric current flows from one of the electrodes through the flange portion 70 of the vehicle component to the other electrode. Since the electrodes 60 and 61 are mounted to the respective holders 50 and 51 supported for vertical movement and rotation by the mechanism including the rock plate 49 pivoted to the piston rod 45 reciprocatively movable within the buffer cylinder 42, the electrodes 60 and 61 can always be held in contact with the flange portion 70 of the vehicle component even if the flange portion 70 is inclined with respect to the horizontal.

Since the structural adhesive coated on the area of the outer panel seamed with the inner panel serves as an insulator, most of the electric current will flow through the uppermost layer of the folded panel flange to heat it, whereas substantially no electric current will flow through the other panel layers. Additionally, since the structural adhesive coated on the outer panel serves also as a heat insulating member and the time of application of electric current to the electrodes is relatively short, the heat of the uppermost panel layer cannot be transmitted to the other panel layers. Accordingly, it is possible to partially set the thermosetting structural adhesive without the occurrence of formation of any oxide film on the outer panel portion exposed to view. It is to be noted that the degree of setting of the structural adhesive can be controlled easily by the choice of the time of application of electric current to the electrodes and the strength of the electric current. The thermosetting structural adhesive coated on the remainder of the connection area is set hard so as to provide sufficient strength to the vehicle component after it is installed on the vehicle and after undercoating of the vehicle. In addition, the adhesive coat protects the panels from rust.

Figure 6:
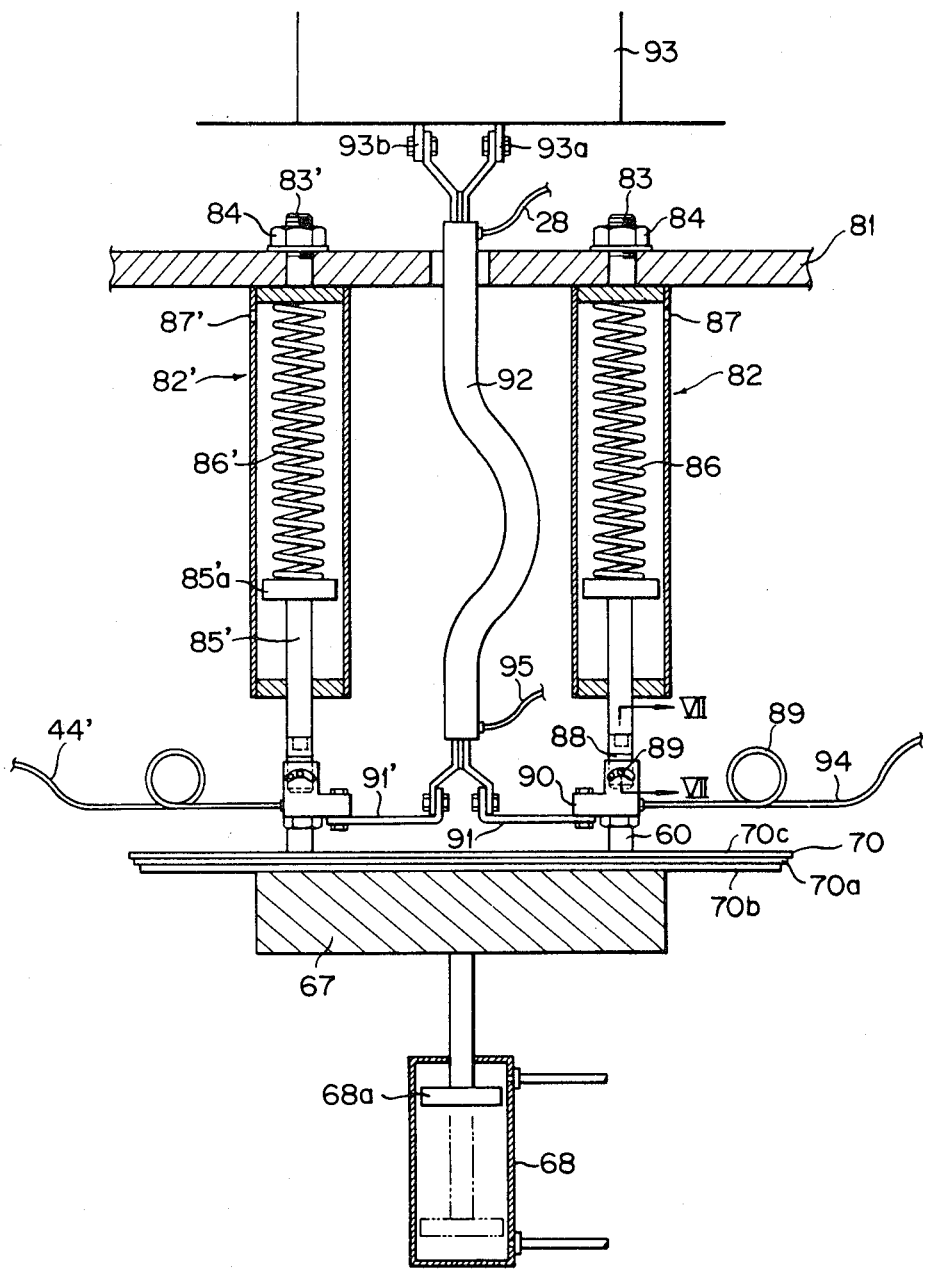
FIG. 6 is an elevational view in section showing an alternative embodiment of the present invention.

FIG. 6 illustrates an alternative embodiment of the adhesive setting apparatus of the present invention. The chief difference between the adhesive setting apparatus 80 in this embodiment and the adhesive setting apparatus 40 in FIG. 4 is that the electrodes 60 and 61 are supported by independent electrode supporting arrangements. The supporting arrangements are generally the same in structure and operation. Accordingly, the parts of one of the supporting arrangements will be described in detail and the parts of the other supporting arrangement which are like those of the first supporting arrangement have been designated by the same reference numeral with a prime suffix and will not be described further. The adhesive setting apparatus 80 comprises a mounting plate 81 and a buffer cylinder 82 mounted at its upper end to the mounting plate 81 such as by bolts 83 and 84. The buffer cylinder 82 contains therein a piston rod 85 having at its upper end a piston 85a and a buffer spring 86 urging the piston 85a downward. The buffer cylinder 82 is formed at its upper portion with an air vent 87. Fixed to the lower end of the piston rod 85 is a connecting member 88 formed of an insulating material and having its lower end connected pivotally through a pin 89 to a holder 90 as shown in detail in FIG. 7. The electrode 60 is mounted to the lower surface of the holder 90. The holder 90 is connected through a conductive arm 91 and a cable 92 to one terminal of a source of electric current 93. A cooling water hose 94 is provided for cooling the holder 90 and the electrode 60 and also another cooling hose 95 is provided for cooling the cable 92. The operation of the adhesive setting apparatus as shown in FIG. 6 is similar to that described in connection with FIG. 4 and will not be described further.

A desirable result was obtained under the following conditions:

| Panel: | vehicle door panel with a thickness of 0.8t |
| --- | --- |
| Electrode Distance: | 60 cm |
| Power Application Time: | 4 to 10 seconds |
| Frequency: | 400 KHz |
| Plate Voltage: | 2.0 to 4.0 KV |
| Plate Current: | 0.3 to 0.6 KA |

It is to be noted that the conditions depend upon the shape and the thickness of the panels to be processed.

The above described panel assembling method and apparatus of the present invention provides the following advantages: First, it is possible to partially set the adhesive coated on a panel for a short time without formation of any oxide film on the panel. Second, adjustment of the degree of setting of thermosetting adhesive and application of mass-production lines are easy. Third, the electrodes are movably supported so that they can always be held in contact with the panels. Fourth, the adhesive coat protects the panels from rust.

The expression "setting the adhesive" as used throughout this invention is intended to mean to set the adhesive to a desired extent such as to polymerize the adhesive by 50%, as well as to fully set the adhesive.

While the invention has been particularly shown and described with reference to preferred embodiments thereof, it will be understood by those skilled in the art that the foregoing and other changes in form and details may be made therein without departing from the spirit and scope of the invention.

TABLE 1

|  |  | Example 1 | Example 2 | Example 3 | Example 4 |
| --- | --- | --- | --- | --- | --- |
| Liquid epoxy resin | bisphenol A diglycidyl ether (available from Sumitomo Chemical Co. under the Tradename ELR-128) | 100 | 100 | 100 | 100 |
| Diluent epoxy resin | 1,1,1-trimethyrol propane triglycidyl ether (available from Sumitomo Chemical Co. under the Tradename ELA-301) | 20 | 20 | 20 | 20 |
| Diluent epxoy resin | 1,4-butane diol diglycidyl ether (available from Chiba Chemical Co. under the Tradename Chiba Alaldite DY-022) | 10.5 | 10.5 | 10.5 | 10.5 |
| Silicon dioxide | silicon dioxide (available from Nippon Aerosil Co. under the Tradename Aerosil #200) | 5 | 5 | 5 | 5 |
| Filler | atomized aluminum powder | 60 | — | 60 | — |
| Filler | natural calcium carbonate | — | 60 | — | 60 |
| Modifier | carboxy terminated butadiene-nitril rubber (available from Nippon Zeon Co. under the Tradename Hycar CTBN 1300X8) | — | — | 10 | 10 |
| Hardener | dicyandiamide | 11 | 11 | 11 | 11 |
| Catalyzer | 2,4,6-tris (dimethyl) aminomethyl phenol (available from Rohm & Hass Co. under the Tradename DMP-30 | 2 | 2 | 2 | 2 |

TABLE 2

| Example | room temperature kinematic viscosities | elevated temperature static viscosities |
| --- | --- | --- |
| 1 | 48,000 | 80,000 |

TABLE 2-continued

| Example | room temperature kinematic viscosities | elevated temperature static viscosities |
|---|---|---|
| 2 | 36,000 | 56,000 |
| 3 | 48,000 | 51,000 |
| 4 | 49,500 | 52,000 |

What is claimed is:

1. A method of assembling metal panels, comprising the steps of:

coating a thermosetting adhesive on a connection area of a first panel;

mating this connection area of the first panel to the connection area of a second panel; and forming an adhesive bond between the connection areas of the first and second panels, said forming being carried out by the step of heating the adhesive by passing electricity substantially only through at least one region of one of said first and second panels to heat said region so as to provide a desired degree of setting of the adhesive in said region of said one panel.

2. A method as set forth in claim 1, wherein said electricity is high frequency electricity.

3. A method as defined in claim 1, comprising the further step of, after an interval following said forming step, heating the entire first and second panels so as to set the entire adhesive coating.

4. A method as defined in claim 1, wherein said heating by electricity, which is part of said forming step, is carried out by passing electricity between a first electrode and a second electrode which are placed in contact with said one panel.

* * * * *